(12) United States Patent
Bourrieres et al.

(10) Patent No.: US 9,582,751 B2
(45) Date of Patent: Feb. 28, 2017

(54) METHOD FOR PRODUCING AN IDENTIFICATION AND AUTHENTICATION LABEL AND ASSOCIATED DEVICE

(71) Applicant: NOVATEC, Montauban (FR)

(72) Inventors: Francis Bourrieres, Montauban (FR); Clément Kaiser, Montauban (FR); Franck Bourrieres, Montauban (FR)

(73) Assignee: NOVATEC, Montauban (FR)

( * ) Notice: Subject to any disclaimer, the term of this patent is extended or adjusted under 35 U.S.C. 154(b) by 0 days.

(21) Appl. No.: 14/766,772

(22) PCT Filed: Feb. 11, 2014

(86) PCT No.: PCT/EP2014/052635
§ 371 (c)(1),
(2) Date: Aug. 10, 2015

(87) PCT Pub. No.: WO2014/122321
PCT Pub. Date: Aug. 14, 2014

(65) Prior Publication Data
US 2016/0004955 A1    Jan. 7, 2016

(30) Foreign Application Priority Data

Feb. 11, 2013  (FR) ...................... 13 51141

(51) Int. Cl.
*G06K 19/10*    (2006.01)
*G06K 19/08*    (2006.01)
(Continued)

(52) U.S. Cl.
CPC .......... *G06K 19/10* (2013.01); *G06K 19/086* (2013.01); *H04N 1/32122* (2013.01); *H04N 1/444* (2013.01); *H04N 1/4426* (2013.01); *H04N 1/4446* (2013.01); *H04N 2201/0082* (2013.01); *H04N 2201/3235* (2013.01); *H04N 2201/3236* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS 7,309,011 B2 * 12/2007 He ..................... G06K 7/10732
235/385
7,438,237 B2 * 10/2008 Bourrieres ............. A61B 5/117
235/494

(Continued)

FOREIGN PATENT DOCUMENTS

EP    1 578 268 A1    9/2005
FR    2 899 361 A1    10/2007

*Primary Examiner* — Paul F Payer
(74) *Attorney, Agent, or Firm* — Im IP Law; C. Andrew Im (57) ABSTRACT

Method for producing a label having at least one identifier and at least one authenticator printed on a printable medium. A unique identifier is generated by a centralized system or a printing device, and the unique identifier is printed on the printable medium incorporating the authenticator. The unique identifier is generated without relation to a product. The method is implemented with a system including one or more printing devices, one or more recording devices and one or more activation devices communicating with the centralized system.

24 Claims, 2 Drawing Sheets

(51) Int. Cl.
*H04N 1/32* (2006.01)
*H04N 1/44* (2006.01)

(56) References Cited

U.S. PATENT DOCUMENTS

| | | | |
|---|---|---|---|
| 8,317,098 B2* | 11/2012 | Roth | G06Q 30/018 235/385 |
| 2006/0091209 A1 | 5/2006 | He | |
| 2006/0095778 A1* | 5/2006 | He | G06Q 10/087 713/180 |
| 2009/0188970 A1 | 7/2009 | Gouelibo et al. | |

* cited by examiner

METHOD FOR PRODUCING AN IDENTIFICATION AND AUTHENTICATION LABEL AND ASSOCIATED DEVICE

RELATED APPLICATIONS

This application is a §371 application from PCT/EP2014/052635 filed Feb. 11, 2014, which claims priority from French Patent Application No. 13 51141 filed Feb. 11, 2013, each of which is herein incorporated by reference in its entirety.

TECHNICAL FIELD OF THE INVENTION

The present invention belongs to the field of the checking of the origin and of the authenticity of objects or of documents.

More particularly, the invention aims to improve the process of generation of the authenticator-identifier pairs of a label so as to simplify the subsequent checking operations.

BACKGROUND OF THE INVENTION

The problem of the authentication of an object, of a document or of a person is an old problem and has been the source of numerous more or less efficient solutions.

Whatever the means implemented, the methods used always have the objective of checking that the object, the document, or its bearer, which is identified is indeed authentic, and is not a copy or an illegitimate bearer.

Some known methods use an authenticating element reproduced identically over a family of products to be able to be recognized by a simple examination, for example a hologram added to the object to be checked. By the very fact of their reproduction many times identically, the checking device and method leaves some doubt as to the authenticity of the product bearing the hologram which may have been reproduced identically on non-legal products.

To resolve this difficulty, it is known practice, in particular from the patent EP 1578268, to mark each object or document, whose authenticity has to be able to be proven, by means of a non-reproducible unique authenticating element associated with an identifier element.

A unique authenticating element is an element which not only exists only in a single copy but which also cannot be reproduced identically or at least can be reproduced identically only with great difficulty or with costs exceeding the benefits that a malicious person could hope for from a reproduction of this unique authenticating element.

As is known, a unique authenticating element is obtained by a random process of scattering elements, for example bubbles in the volume of a transparent polymer, and it is not reproducible when the only means of obtaining a similar result is precisely the random process.

This case is exactly that of bubble codes.

An identifying element is more often than not a code assumed to identify a product, by a category number or part number (P/N), associated or not with a serial number (S/N).

It is thus known that a manufacturer of products has a database of its identifiers with which it associates characteristics of the authenticating element. A person wanting to check the authenticity of a product is then able to connect to the database to check the consistency of the identifier-authenticator pair for the object that he or she holds with that of the database.

A drawback of this checking method stems from the need to manage databases for each category of objects, management processes that are handled by users who apply the authenticating elements, for example labels incorporating three-dimensional bubble codes, and can lead different users to use a same identifier, for example an alphanumeric code, unique to each of them, and which will be associated with different authenticators.

When the products are unrelated to one another, the consequences seem negligible in terms of security.

When the products belong to a same category, a risk of confusion could arise, whether by chance or by design.

Such a risk seems all the more probable when the authenticating elements are standardized and likely to be produced in large numbers by one or more manufacturers such as, for example, the authenticating elements comprising colored fibers in a substrate.

OBJECT AND SUMMARY OF THE INVENTION

The invention relates to a method for producing labels or printable media which provides a solution to these various problems.

The label or the printable medium produced according to the method comprises at least one identifier and at least one authenticator, the identifier being printed on the label or the printable medium, label or printable medium which incorporates at least one authenticator and which constitutes all or part of the label or of the printable medium. The authenticator can be incorporated in an ink or a varnish or a laminate added to the label or the printable medium. The authenticator can also be included in the mass of the substrate forming the label or the printable medium.

The identifier is printed by a printing device and the method is characterized in that it comprises:

a step of generation of a unique identifier;

a step of printing of the unique identifier on the label or the printable medium incorporating the authenticator;

the unique identifier being generated without relation to a product for which the label or the printable medium is or will be intended.

Thus, according to the method, each label or printable medium produced is unique by its single identifier, regardless of its final destination.

By making it possible to produce labels without knowing the destination thereof, a printer of labels and/or of printable media is able to produce labels or printable media, at least in an intermediate stage, without any concerns about the products that have to be labeled or the documents that have to be printed and thus supply labels and printable media to different users.

A printer is also able to produce labels and printable media of different styles, for example by their shapes, their sizes or their decorations, for different users, without having to worry about issues of identification of the labels or of the printable media and of how they are paired with authenticators, each label or printable medium receiving, through the implementation of the method, an identifier which is unique to it.

In one implementation of the method, the unique identifier is generated by a centralized system remote from the printing device and transmitted to the printing device by this centralized system in an interrogation step during which the printing device connects to the centralized system.

Before transmitting a unique identifier to the printing device, preferably, the centralized system checks, in the interrogation step, or at least in a connection step, that the printing device is authorized to receive a unique identifier. Such an authorization is, for example, conditional on a prior registration of the printing device with the centralized system such that the printing device will be recognized when it interrogates the centralized system with certain rights managed by the centralized system. Thus, only a known printing device authorized to print labels or printable media by implementing the method will receive unique identifiers and the centralized system will be able to ensure the traceability of the labels or of the printable media.

There is thus not only a guarantee that the identifier is unique by virtue of the single source of generation of the identifiers, but also that only printing devices will be able to receive identifiers.

In another implementation of the method, the unique identifier is generated by the printing device, the printing device being referenced in the centralized system and authorized to generate and to print series of unique identifiers.

Such referencing comprises, for example, a prior registration of the printing device with the centralized system and the assignment to the printing device of a unique origin code. The printing device incorporates the origin code in unique identifiers that it generates locally to generate unique identifiers at the centralized system level.

It is thus possible to generate and print unique identifiers on a printing device without the need to interrogate the centralized system which proves particularly advantageous in terms of speed of production of the labels or of the printable media with a high rate of production.

It should be noted that, in this case, the centralized system will have knowledge of the identifiers when the labels or the printable media are recorded.

It should also be understood that the two modes of implementation of this step of the method by printing devices are compatible, different printing devices being able to use different modes and a same device being able to operate alternately in each of the modes.

The method preferably comprises a step of acquisition of at least one image of the authenticator, which is borne by the label or the printable medium on which the unique identifier is printed, by a recording device, of transmission of the image of the authenticator by the recording device to the centralized system and of storage, in a database of the centralized system, of the image of the authenticator coupled with the unique identifier which is printed on the label or the printable medium by the printing device.

The database is managed by the centralized system and the different elements, real or virtual, that make up the centralized system are not necessarily physically located in a same location and can be situated in different geographic locations although forming one functional unit.

Thus, the essential attributes of the label, still without necessarily having been assigned to a product, are known to the centralized system where they are coupled and paired inasmuch as the identifier and the authenticator are two unique attributes of a same label, neither of which, even taken in isolation, is located on another label.

In one implementation of the method, the recording device also acquires the identifier printed on the label or the printable medium, for example by an optical reading of this identifier, and transmits the acquired unique identifier associated with the acquired image of the authenticator such that the centralized system checks that the recording of the label or of the printable medium is possible, that is to say at least that the identifier acquired and which is transmitted to it has actually been generated by the centralized system or by a printing device referenced in the centralized system, and in this case incorporates the origin code assigned to the printing device concerned, and, if such is indeed the case, that it has not been assigned to a label or a printable medium previously recorded. Otherwise, the centralized system rejects the request to record the label or the printable medium which avoids illicit labels or printable media being produced and recorded by the centralized system without having been detected.

Before proceeding with a recording requested by a recording device, preferably the centralized system checks, upon the transmission of an image of an authenticator and/or of an identifier, or at least in a connection step, that the recording device is authorized to transmit authenticator images and to request the recording of labels or of printable media. Such an authorization is, for example, conditional upon a prior registration of the recording device with the centralized system such that the recording device will be recognized when it interrogates the centralized system with certain rights managed by the centralized system. Thus, only a known recording device authorized to request the recording of the labels or of the printable media by implementing the method will be able to transmit authenticator images which will be stored by the centralized system allowing the centralized system to be able to ensure the traceability of the labels or of the printable media.

The method also preferably comprises a step of activation of the label or of the printable medium, an activation step which comprises a request for activation of the label or of the printable medium, comprising the transmission of the identifier such that the centralized system, having generated the identifier and having, in its database, an image of the authenticator borne by the label or the printable medium to which the identifier is assigned, knows that the label is assigned to a product and that interrogations concerning the authenticity of a label are legitimate.

If the label or the printable medium has not been recorded by the centralized system or has been previously activated, the request for activation of the label or of the printable medium is rejected by the centralized system.

Thus, any risk of activation of a label not having gone through the preceding steps of the method, and of reuse of a label having already been activated, is avoided.

Before proceeding with an activation requested by an activation device, preferably the centralized system checks, upon the reception of a request for activation, or at least in a connection step, that the activation device is authorized to request the activation of labels or of printable media. Such an authorization is, for example, conditional upon a prior registration of the activation device, or of the identity of a rights holder authorized previously to request the activation of a label or of a printable medium, with the centralized system such that the activation device will be recognized when it interrogates the centralized system with certain rights managed by the centralized system. Thus, only a known activation device authorized to request the activation of the labels or of the printable media by implementing the method will be able to obtain from the centralized system that labels or printable media are activated.

Only when a label or a printable medium has been activated will it be able to be legitimately used and will it be able to be authenticated by a subsequent interrogation of the centralized system during a product or a document authenticity checking operation.

Additionally, according to the method, specific information related to a product and/or a category of products and/or an informational content of a document are associated with the identifier-authenticator pair of the label or of the printable medium recorded in the database of the centralized system.

In one mode of implementation of the method, the transmission of the at least one image of the authenticator and the request for activation of the label are performed during a same communication with the centralized system.

In one mode of implementation of the method, the interrogation of the centralized system to obtain a unique identifier, the transmission of the at least one image of the authenticator and the request for activation of the label are performed during a same communication with the centralized system.

In one mode of implementation of the method, a plurality of independent printing devices communicates with the centralized system to obtain unique identifiers or independently generate unique identifiers, and/or independently a plurality of independent recording devices connected to the centralized system to transmit images of authenticators, and/or independently a plurality of independent activation devices connect to the centralized system to request activations of labels.

Thus, numerous independent players, acting without coordination to perform similar steps and/or different steps of the method, are able to be involved in the production of the authenticated labels without any coordination being necessary between the different players.

In one mode of implementation of the method, the images of authenticators are processed, by the recording device which acquires the images and/or by the centralized system which stores them, to translate these images into digital data allowing for an automatic comparison, by electronic means, of these images with images acquired and processed subsequently in the context of a check on the labels and/or printable media.

Thus, during a subsequent interrogation of the database of the centralized system, it will be possible to proceed automatically with the comparison of the image acquired on a label affixed to a product or a document with that stored in the database associated with the unique identifier of the label.

Advantageously, the label or the printable medium is a substrate comprising colored fibers and/or added particles, contrasting with the color of the substrate, scattered chaotically in said substrate, and in which the authenticator corresponds to an arrangement resulting from the scattering of said colored fibers and/or of said added particles, considered in at least one area of a sheet produced with said substrate.

In an economical mode of implementation of the method, the substrate is a paper or a synthetic material or an adhesive or an ink or a varnish or a cardboard or a plastic. It is thus possible to produce labels or printable media suitable for numerous uses, particularly in the field of packagings or secure documents.

In a mode of implementation that has a particularly high level of authentication, the authenticator is a bubble code, incorporated in the label or in the printable medium, comprising a transparent polymer in which are captured bubbles whose shapes, dimensions and arrangement are the result of a process of chaotic formation of the bubbles in the polymer.

In the case of a printing device generating unique identifiers independently, a unique identifier is the result of a combination of the unique origin code assigned to the printing device concerned and of an identifier, unique to this printing device and generated by it, such that the unique identifier that is the result of this combination is unique to the centralized system.

The invention relates also to a device suitable for implementing the method.

The device for manufacturing labels and/or authenticatable documents comprises:
- at least one printing device;
- at least one recording device;
- at least one activation device;

and comprises a centralized system, itself comprising a database and, also:
- the printing device comprises a generator of a unique identifier, incorporating a unique origin code assigned to the printing device, and/or comprises means for communication with the centralized system configured to transmit a request for assignment of a unique label or document identifier and the centralized system is configured to transmit, to the printing device, in response to its request, a unique identifier, and to store the unique identifier in the database;
- the recording device comprises means for acquiring at least one image of an authenticator borne by a label or a document during manufacturing and communication means for transmitting the at least one image to the centralized system, the centralized system being configured to store the image in the database associated with the unique identifier of the label or of the document bearing the authenticator;
- the activation device comprises means for communication with the centralized system configured to transmit a request for activation of a label or of a document bearing a unique identifier and at least one authenticator.

In one embodiment, the device for manufacturing labels and/or authenticatable documents comprises a plurality of printing devices and/or a plurality of recording devices and/or a plurality of activation devices whose communication means are configured to establish communications with a same centralized system.

The device is thus interoperable by allowing multiple players acting on the different means implemented to participate in the production of the labels and/or of authenticatable documents without each player having to take into consideration the other players and the multiplicity of the possible destinations for the labels and/or the documents.

In one embodiment, the device for manufacturing labels and/or authenticatable documents comprises one or more independent production units each combining at least one printing device, at least one recording device and at least one activation device to ensure all of the printing, recording and activation functions by communicating with the centralized system.

In one embodiment, the printing means of the device for manufacturing labels and/or authenticatable documents implemented to print the labels and/or the documents are arranged to print the labels and/or the documents on a paper medium and/or on a medium of synthetic material.

BRIEF DESCRIPTION OF THE DRAWINGS

Other features of the invention will become apparent on reading the following figures given as nonlimiting examples.

DETAILED DESCRIPTION OF THE EMBODIMENTS

Figure 1:
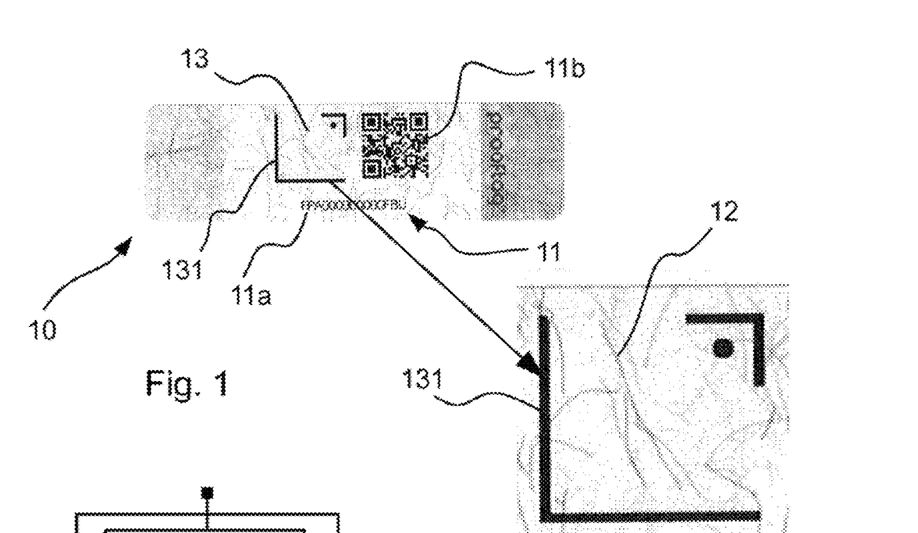
FIG. 1 represents an exemplary printed label produced with a paper comprising scattered colored fibers.

FIG. 1 represents an example of a label 10 comprising an identifier 11, here in the form of a code printed on the label in the form of an alphanumeric code 11a and also contained in a printed matrix code 11b (also called QR code or data matrix).

The label 10 which serves as printing medium for the identifier is produced in the substrate in which colored fibers 12 have been scattered during its production. Such a substrate is, for example, a paper.

Colored fibers should be understood to mean fibers which can be visually distinguished, at least under certain lighting conditions, from the ordinary fibers forming the main structure of the substrate. In a particular case, the fibers could be light and the substrate could be a dark color. In the present description, the expression colored fibers is to be understood in its fairly broad sense in which the colored fibers are fibers exhibiting a contrast which makes them observable, at least in certain lighting conditions, relative to the substrate in which they are incorporated.

The fibers 12 can be monochrome or correspond to a mixture of fibers of different colors. The color of the fibers differs from the basic color of the substrate, and is, as appropriate, sensitive or not to certain wavelengths of the light spectrum such as the ultraviolet for example, so as to be able to be observed visually when a sheet of substrate is illuminated. The fibers are of non-predetermined different sizes and, through the process of production of the substrate, the pattern formed by the fibers in an area is the result of a chaotic process in which each fiber has dimensions, a position and a form that are random.

In the case of the label 10, an area defined by a frame 131 serves as authenticator 13. In the present detailed description of an exemplary embodiment, and generally in the present document, the term authenticator is used to define an element which characterizes the label or a printable medium and which is implemented to authenticate the label or the printable medium.

The authenticator 13 corresponds to the structure of the colored fibers 12 captive in the substrate in the frame 131. This structure has a unique appearance by virtue of its process of formation because, even for a surface area of a square centimeter as in the case of the label illustrated in FIG. 1, the probability of the same observable pattern being reproduced twice is practically zero on the human scale.

Furthermore, it is practically impossible, or at the very least extremely difficult, to reproduce the pattern of a given label. In the label 10, each fiber is intimately mixed with the material of the substrate, for example with the other fibers of the paper, when the substrate is paper, with which it is entangled, intersects and is overlaid to a greater or lesser extent, giving it changes of intensity and of contrast which combine with the form and the color of the fiber.

These combinations of features are naturally different for each colored fiber 12.

Experiments show that even an attempt to reproduce the image of the pattern observed in the area 131 is detected by visual observation, on the one hand because of any shades which characterize the authenticator and on the other hand because the observed pattern of the authenticator is not that of a simple surface image of the substrate but also involves effects of translucency which can be exploited to detect an illegal reproduction of a label.

Because of this, it will be understood that the label 10 or printable medium meets objectives of reasonable costs for mass production and of difficulties, even of practical impossibility, in reproducing the authenticator of a label or of a printable medium with a quality which would make it almost impossible to visually detect differences between the original and its attempted reproduction.

A substrate that meets the characteristics of that of such a label or of such a printable medium can be produced without particular difficulties by any industry equipped to produce paper or another substrate and a very wide distribution of labels and of printable media of this type to numerous users wanting to authenticate the products of their productions increases the risk of security failings in the checking of the authenticity of a product bearing such a label or of a document produced on such a printable medium.

Figure 2:
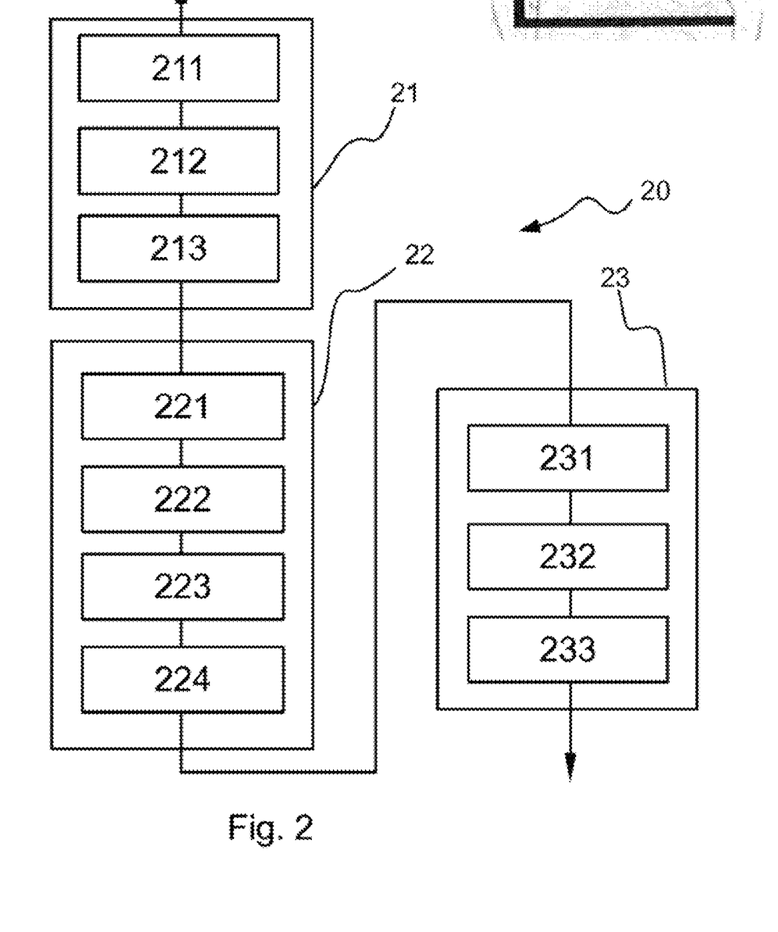
FIG. 2 represents a simplified block diagram of the method for producing a label.

According to the process represented schematically in FIG. 2, the process 20 of production of a label 10 comprising an identifier 11 and an authenticator 13 comprises at least three steps.

In a first step 21, a label or a printable medium is printed on a substrate 30 comprising fibers or colored fibers distributed randomly, the result of a chaotic process.

The substrate 30 is packaged, depending on the type of printing device which is implemented, in standardized sheets or in rolls for continuous production. In one form of implementation, the substrate comprises an adhesive face on which is placed a peel-off protection which will be removed before applying a label to a product. The substrate may also be precut in sets comprising one or more different desired label forms and/or dimensions.

Figure 3:
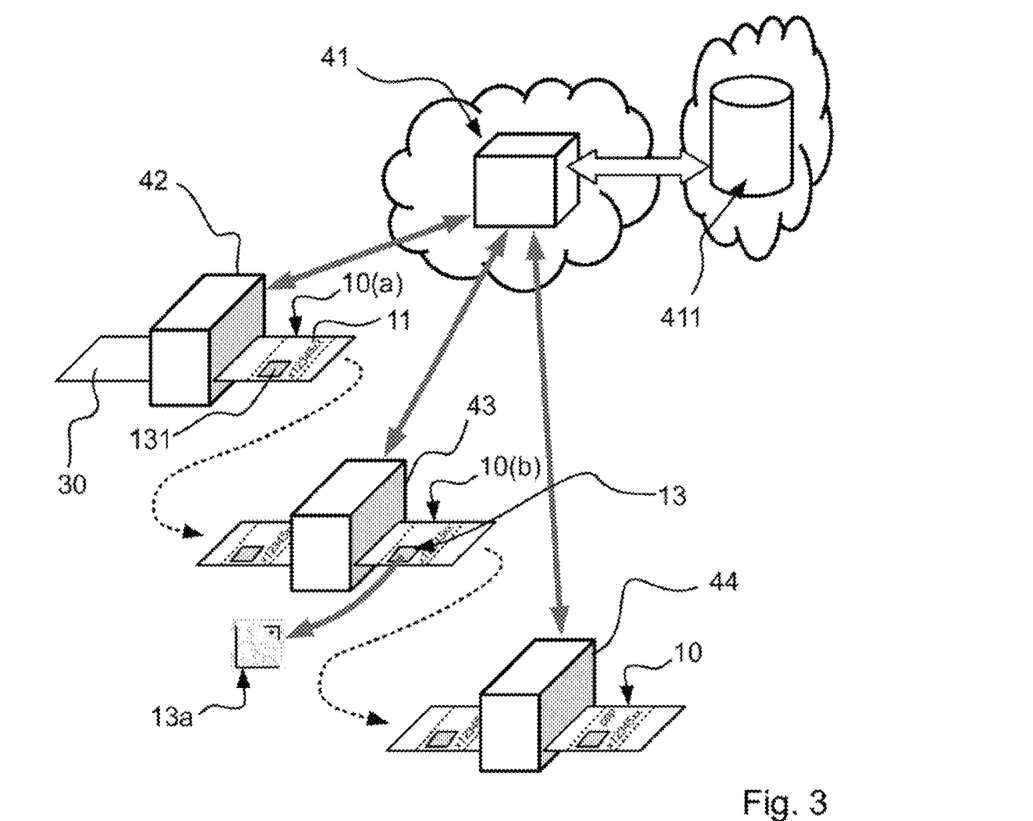
FIG. 3 represents a schematic view of a first example of means for implementing the method.

In the first step 21, a centralized system 41 for the generation and management of a single database 411 is interrogated, substep 211, by a label printing device 42 in order to obtain a unique identifier 11.

The centralized system 41 generates a unique identifier 11 which is stored in the database 411, so as to be recorded therein as having been assigned to a label or to a printable medium, and transmits said identifier to the printing device 42 that formulated the request for assignment of an identifier, substep 212.

The printing device 42 performs the printing, substep 213, of the label according to a desired format, for example according to the format illustrated in FIG. 1, by creating an area corresponding to an authenticator 13, for example by printing a frame or symbols delimiting a frame, and by printing the unique identifier 11 which has been communicated to it by the system 41, for example in an alphanumeric form 11a and/or in a matrix code form 11b and/or, generally, in any other form in which the identifier can be read.

It should be understood here that the centralized system 41 which assigns the unique identifier to the label does not need, at least for technical purposes, in this step of the method, the identity of the user who will use the label or the knowledge of the type of product for which the label which bears the unique identifier number is intended.

In this step of the method, the label 10(a) has no logical link with a product that has to bear the label.

It should also be understood that a plurality of label printing devices 42, likely to use a substrate originating from various production sources, can coexist.

In this case, all the printing devices which interrogate the same centralized system 41 to obtain an identifier 11 are assigned, for each label, independently of the printing device, an identifier whose uniqueness is guaranteed by the single source of assignment of identifiers formed by the centralized system 41 which manages the database 411.

In one mode of implementation, not illustrated, the unique identifier 11 is generated by the printing device 42 without connection to the centralized system (41).

In this case, the substeps 211 and 212 of the first step 21 are not carried out and the printing device 42 generates a unique identifier from an origin code which characterizes said printing device and from a unique identifier local to said printing device generated by the printing device itself.

In this case, the unique identifier 11 assigned by the printing device 42 is the result of a combination of the origin code of said printing device and of the local unique identifier.

In this case, each printing device is referenced in the centralized system 41 and the uniqueness of the origin code of each printing device guarantees that, at the centralized system level, all the identifiers printed on labels or printable media are unique, regardless of the printing device that has printed a label or a printable medium.

The system 41 is, for example, accessible via the internet network or another communication means, and its structure and its location are transparent to the devices which proceed with the interrogations to receive an identifier.

In particular, the system 41 can comprise means grouped together or scattered communicating with one another. In particular, all or some of the means of the centralized system may be dedicated to said centralized system or be the result of a system division handling diverse independent functions, for example by a display system. In particular, the database may be remote from the processing units, split up into a plurality of parts, duplicated, etc.

In a second step 22, a recording device 43 performs, substep 221, an acquisition of the label 10(*a*), advantageously an optical acquisition, of the identifier 11 and performs an acquisition of the authenticator 13, which is embodied by the frame 131, to extract an image 13*a* therefrom.

The recording device 43 then transmits, substep 222, the read identifier 11 and the acquired image 13*a* of the authenticator 13 to the system 41.

The system 41 checks, substep 223, that the identifier transmitted is indeed a unique identifier which exists in the database 411, or that it has been generated by a device whose origin code is referenced, and that it has not yet been paired with an authenticator, the request made by the recording device 43 being rejected if these conditions are not fulfilled.

When the unique identifier exists in the database, or it is recognized as valid because of its origin code, and it is not yet paired with an authenticator, the system 41 proceeds with the pairing, substep 224, of the identifier 11 with the image 13*a* of the authenticator 13, the latter being retained in the database 411 associated with said identifier and attesting that the label 10(*b*) or the printable medium is then recorded.

At this stage, it should once again be noted that there is no need for the destination of the label 10(*b*) or of the printable medium to be known.

At the very least, the label or the printable medium produced in the first step 21 and recorded in the database of the centralized system in the second step 22 is not at this stage assigned to a particular product. In this respect, the information stored in the database 411 makes it possible to determine that the label 10(*b*) or the printable medium is not assigned to a particular product.

Thus, an interrogation of the database in order to authenticate a product which might bear a label at this stage of its production will lead to a rejection because the label 10(*b*) is not able to meet the authentication of a product marked by said label, because this label has never been associated with a product in the database 411.

For the label or the printable medium to be able to fulfill its function of authentication of a product or of a document, in a third step 23, the label or the printable medium is activated.

This step is performed when the product having to bear the label, or the document having to use the printable medium, is known, at least when the characteristics of the product or of the document are known.

In a substep 231, the identifier 11 of the label 10(*b*) or of the printable medium is reread by an activation device 44 which interrogates the database 411 and sends to the system 41 a request for activation of the label or of the printable medium.

If the label or the printable medium is recognized as being able to be activated, that is to say that the identifier 11 is actually known and paired with the image 13*a* of an authenticator in the database 411, on the one hand, and that the label or the printable medium has not yet been activated on the other hand, the system 41 activates the label 10 or the printable medium which is then recorded as such in the database 411, substep 232.

In a preferred form of implementation, the activation is performed by implementing secured communication protocols which make it possible to check that the activation has been performed only by an authorized user of the system 41 and with an activation device 44 recognized by the system 41.

Advantageously, at the activation stage, at the latest, the label or the printable medium is associated in a database with characteristics of the product or of the document, which may be generic characteristics, for example for a product, the type or the category of the product such as a bottle of wine (make, origin, vineyard, vintage), and/or characteristics specific to the product bearing the label, for example its serial number which is in principle unique for a particular product family.

These characteristics, which are essentially informative, can be used to check that the authentic, and activated, label or printable medium has not been diverted from its planned destination.

These characteristics can be stored in the database 411 of the system 41 or can be stored in an ancillary database, functionally and/or physically separate, where they are associated with the unique identifier 11 assigned to the label 10 and known to the centralized system 41.

Such an arrangement is possible because the centralized system 41 is the means implemented in order to guarantee the authenticity of the label or of the printable medium which is independent of the product bearing the label or of the document using the printable medium while the ancillary database gives, for example, characteristics of the product which makes it possible, as necessary, to check that an authentic label is indeed affixed to the product for which it has been printed and activated.

In a form of implementation of the method, additional data relating to the product having to bear the label 10 are printed on the label or the printable medium, for example in the activation step, substep 233.

Such additional data consist, for example, of a product name, a part number (P/N), a serial number (S/N) or other information.

Generally, for security and/or administration reasons, each printing, recording and activation device is preferably previously registered and referenced by the centralized system and each new connection of one of said devices to the centralized system is associated with a check on the authorizations assigned to the connecting device.

The description of the method which has just been given corresponds to a logical order of sequencing of individual steps which is not however obligatory.

The person skilled in the art will be able to choose, for example, to group together all the printing steps. There is nothing to exclude printing the information relating to the product (substep 233 of the step 23) simultaneously with the other elements printed in the substep 212 of the step 12. In this case, the affixing of the labels to the products should be managed in order for each product to receive the label which is intended for it in accordance with the content of the database 411 following the activation of the labels.

When the marked products do not include any particular feature in a family, for example not bearing a serial number as will be the case with packets of cigarettes, there is no difficulty in producing the labels in large numbers in their final state during a same printing operation.

The known management means also make it possible to manage the assignment of preprinted individualized labels to products, but this solution is generally more costly in terms of means and of management than in the case where the individualized label is produced at the time when it has to be affixed.

As is observed from the description of the method and of the means implemented, different players are, as necessary, assigned to the different steps of the method.

A first main player is the manufacturer of the substrate comprising the fibers or other colored particles 12 scattered chaotically. The manufacturer of the substrate is involved here as a supplier of means for implementing the method. Said manufacturer delivers the substrate in any form of packaging suited to the printing means which will be implemented when printing the labels or the printable media.

If appropriate, the substrate will have been treated by a converter to produce semi-finished labels, without any printing or with only a generic printing, but precut and coated with an adhesive on one face, with a view to being printed, or to package the printable media.

In practice, each one of the substrate manufacturer and/or of the converter may be singular or, on the contrary, plural, without the efficiency of the method being affected.

A second main player is the printer producing the labels or the printable media comprising at least the printed elements provided in the step 21 and comprising the unique identifier 11 assigned by the centralized system 41 to the label, or generated by the printing equipment, the identifier of a label or of a printable medium being unique independently of the printer printing the label or the printable medium.

A third main player is the one recording the label or the printable medium by initiating the coupling in the database 411 of the unique identifier 11, printed previously on a label or a printable medium, with the authenticator 13 by communicating to the centralized system 41 an image 13a of said authenticator borne by said label or said printable medium on which said identifier has been printed, which has the effect of making the identifier-authenticator pair forgery-proof in practice.

A fourth main player is the one who performs the activation of the label or of the printable medium in the database 411 in the activation step 23.

This fourth main player is, for example, close to a user who affixes the label to a product or who creates a document on the printable medium, if not said user.

There can be multiple users affixing labels 10 or creating documents on printable media each comprising a unique identifier assigned by the centralized system 41 or by a printing device 42, the number of these users being without any correlation to the number of the other players. Furthermore, some players may be one and the same.

According to the method, despite an unlimited number of players in each of the steps from the supply of the substrate 30 to the application of the labels 10 on the products or the production of documents on printable media, a unique identity is obtained for all the products or documents together with a guarantee that the marking produced by a label cannot be diverted from its destination defined by the users of the label or that the documents produced on printable media are authentic.

The guarantee is obtained that a same identifier will not be able to be used two or more times, legitimately, to designate different products or documents, which makes it possible to render all the identification-authentication systems interoperable without the need for any concern about the multiplicity of the players described previously, or about the multiplicity of the types of products that have to be labeled or of the types of documents.

The method allows for a significant gain in the effectiveness of the subsequent authenticity checks.

As is known, when there is a desire to check the authenticity of a product via its label or of a document by its printable medium, the database 411 comprising the identifier-authenticator pairs is consulted to check the legitimacy of the pair present on the label or the printable medium.

According to the method, the database 411 is independent of the products and documents and the search by the unique identifier of the label or of the printable medium in the database is speeded up as is the management of a single database which is intrinsically simplified.

The means implemented to print and to activate the labels and the printable media, and which must at a given time communicate with the centralized system 41 and its database 411, are in a dissociated embodiment, particularly when the players implementing them are different.

The device for printing the labels 42 or the printable media comprises printing means suitable for transferring, to the labels or printable media in substrate, the unique identifier 11, variable for each label 10 and each printable medium, and the frame 131 of the area of the authenticator, in practice the creation of a frame, if appropriate other fixed markings defined by one of the players or a third party (administration, standardizing organization, etc.).

The device for printing the labels 42 or the printable media also comprises, if necessary, communication means, suited to the communication mode provided, for transmitting a request to the centralized system 41 and obtaining from said system an identifier to be printed for each of the labels or of the printable media that it has to print.

In one embodiment, the device for printing labels 42 produces requests in batches, which amounts to requesting the assignment of a number N of identifiers in order to print a series of labels. It should be noted here that this type of request does not affect the security of the process because of a recording step and a subsequent activation step necessary for each label taken individually.

The recording device 43 which ensures the acquisition of the authenticator 13 and, in a coordinated manner, of the identifier 11 which is associated with it on a label 10 comprises optical acquisition means suitable for reading the identifier 11 and acquiring an image 13a of the area of the label corresponding to the authenticator 13. Furthermore, the recording device 43 comprises means for communication with the centralized system 41 enabling it on the one hand to transmit to said centralized system the identifier and the image of the area of the authenticator and, on the other hand, to receive information on the validity of the identifier transmitted and the agreement of the coupling in the database 411 of the identifier and of the image of the authenticator, which is equivalent to a validation of the label or of the printable medium at the stage of the reading performed by the recording device 43.

Incidentally, the recording device 43 comprises a means acting on the label or the printable medium to render said label or said printable medium unusable when the latter is rejected by the centralized device 41, for example a means which punctures the label or the printable medium, producing one or more holes on a useful area, the area where the identifier is inscribed and/or the area of the authenticator, or which soils the label or the printable medium with an indelible ink.

The activation device 44 mainly comprises means for communication with the centralized system 41 so as to transmit to said centralized system a request for activation of a label 10(*b*) or of a printable medium bearing a unique identifier (11) assigned by said centralized system and for receiving from said centralized system an authorization to use the label or the printable medium.

The activation device 44 also comprises, as needed:
- acquisition means (for example barcode reader, keyboard, connections to a local area network, or any other means suitable for accessing information to be acquired) of characteristics of an object for which the label currently being activated is intended or of a document that has to be produced with the printable medium currently being activated;
- means for communication with a product database which can be independent of the database 411 of the centralized system 41;
- printing means suitable for printing on the label 10 or the printable medium, in an area intended for complementary printing, data relating to the product for which the label currently being activated is intended or to the document that has to be produced with the printable medium currently being activated.

Figure 4:
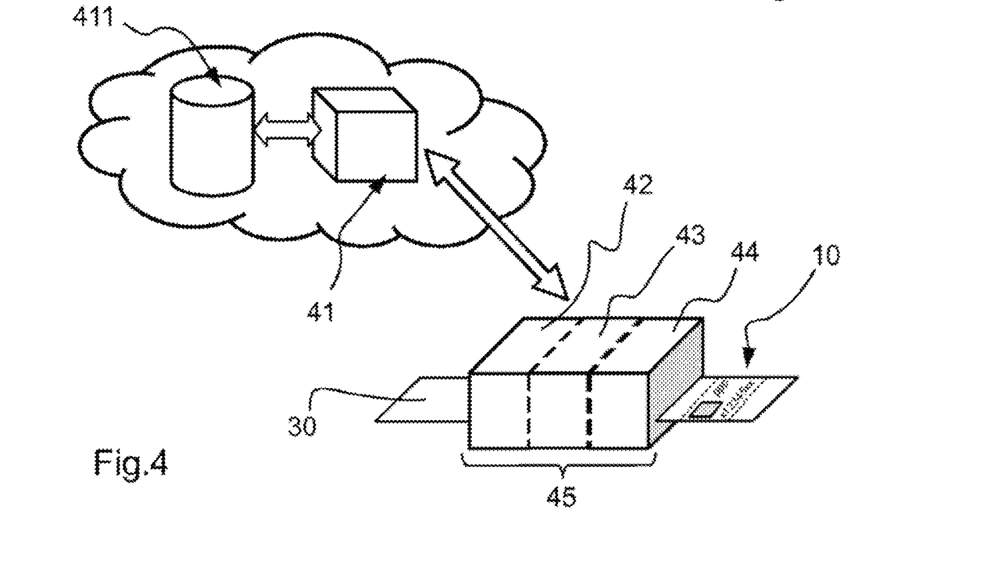
FIG. 4 represents a schematic view of a second example of means for implementing the method.

In one embodiment, illustrated in the FIG. 4, the printing 42, recording 43 and activation 44 devices are grouped together in a standalone production unit 45.

The functional architecture of such a standalone production unit is thereby simplified compared to a system comprising separate devices and primarily comprises a single means for communication with the centralized system 41, a single printing means suitable for printing the different markings provided in the printing step and in the activation step, and recording means.

With such a unit for processing the labels, the order of the steps of the process can be adapted, for example to optimize the communications with the centralized system 41 and the printing operations, without prejudicing the result obtained on the label.

For example, the standalone production unit for producing labels 45:
- firstly, receives, for example from an operator or from a supervision system (not represented), an order for production of a label 10 for a product with characteristics specific to this product that have to be stored in a database and/or printed on said label;
- after having introduced a medium for the printing of a label, reads the area of the authenticator to produce a temporarily stored image 13*a* thereof. It should be noted that, in this case, the area is not yet created on the label but, since its position is determined by the structure of the label, the recording means can use a mask, physical or electronic, to produce the desired image 13*a* of the authenticator 13;
- connects to the centralized system 41 to obtain a unique identifier or itself generates the unique identifier from a unique origin code having been assigned to it, followed by a recording, by the transmission to the centralized system of the unique identifier with the image 13*a* of the area of the authenticator, and an activation request to the centralized system with the transmission of the data required on the product having to bear the label to the database 411 of the centralized system on the one hand and, as appropriate, an ancillary database;
- prints the label 10, adding thereto the unique identifier 11 of the label, the marks 131 creating the area of the authenticator 13, the elements characteristic of the product for which the label is intended, generic elements desired for a family of labels.

Incidentally, for example in the context of quality monitoring, the unit for processing the labels 45 performs a read of the label and checks, by an interrogation of the centralized system 41, that the label is correctly printed.

One advantage of such a standalone production unit performing all of the operations necessary for the production of a label lies in its ease of implementation which allows for the production of labels on demand when packaging a product, or of being incorporated in a packaging line where this unit can form part of a labeling station.

In another embodiment, the printing device 42 is independent so that it can be implemented by a printer, and the recording device 43 and the activation device 44 are combined in a same unit that can be implemented by a packager of products having to be labeled.

The invention which has been described in detail according to an embodiment implementing labels printed on a substrate containing fibers or colored particles is open to variants.

For example, the colored fibers can comprise fibers that are invisible or visible in white light and which are sensitive to ultraviolet light such that the image of the authenticator in ultraviolet light will be different from that in white light. In this case, the image 13*a* of the authenticator stored in the database can be the image in white light only, in ultraviolet light only or both images, in white light and in ultraviolet light, even images produced in other spectra or in particular lighting conditions.

The invention can also implement, as authenticating means on printable labels, other observable elements produced by a chaotic process.

Such authenticating means can for example correspond to added particles of varied forms and/or colors scattered randomly on the surface of or in a substrate inasmuch as, for the requirements of the invention, said substrate can be printed.

Such a substrate can be a paper as in the case of the fibers described previously, and can also be a synthetic material or an adhesive or an ink or a varnish or a physically possible combination of all or some of these products.

The end result of the substrate can be, as nonlimiting examples, an adhesive label, a non-adhesive label, a card, a case, a box, a tube, a stopper, a plastic vessel, a plastic sleeve, a shrinkable sleeve, a security seal, etc.

Such authenticating means can, in a simplified form, at the cost of a weakening of the non-reproducible nature of the authenticator, consist of symbols printed on an area of the label, the desired chaotic nature resulting from a random or pseudo-random distribution of various symbols that are differentiated for example by their forms and/or by their dimensions and/or by their colors.

On the other hand, such authenticating means can, in a complex form, consist of bubble codes comprising constellations of bubbles scattered in a transparent polymer and deriving from a formation process generating an unpredictable and non-reproducible chaos. In this case, the authenticator is incorporated in the label so as to become indissociable therefrom, without destroying it or making it lose its original characteristics.

Generally, the method can be implemented for the production of a label on its own or incorporated on a printable medium.

Furthermore, the quantity and the variety of the information printed on the label and/or the printable medium are not limited and a same label and/or printable medium can comprise a plurality of authenticators to reinforce the subsequent check possibilities.

A label and/or a printable medium can also comprise a more or less large area used for the printing of information without consequences on the subsequent authenticity checks on said label and/or said printable medium. Such information is for example text, drawings, images, for example for information purposes or for advertising purposes, the principle of the label and/or of the printable medium offering numerous possibilities at lesser cost.

One solution in these cases is to perform the printing of such information, a priori intended for a family of labels and/or of printable media, by the printing device 42, which will then be chosen with printing capabilities (graphics, photographs, colors, etc.) to produce, in quantity, labels 10(a) and/or printable media prepared for the subsequent steps of production of the labels and/or of the printable media according to the method and for which subsequent steps there is no longer any need to have printers comprising as many capabilities.

In one embodiment, the label 10 and/or the printable medium also comprises information necessary for connecting to the centralized system 41 for the purposes of conducting checking and verification operations and ensuring that a product marked by a label and/or a printable medium is authentic.

Such a check advantageously comprises a comparison of the image 13a of the authenticator stored in the database 411 of the centralized system 41, associated with the unique identifier of the label, with the authenticator as can be observed on the label and/or the printable medium.

A verification can result from a visual check consisting in comparing the image 13a restored by the database 411 with the authenticator 13 visible on the label and/or the printable medium and in a confirmation that the authenticator of the label or of the printable medium is not just a simple image not reproducing the complex structure of the authenticator 13.

The complex structure of the authenticator 13 of the label 10 or of the printable medium, for example the colored fibers 12 or particles scattered in the substrate of the label or of the printable medium chaotically, will not be confused by an observer with a simple reproduction which could also correspond to the image stored in the database 411.

A verification can result from an acquisition of an image of the authenticator and from a comparison by digital means of a digital representation of this image with a digital representation recorded in the database.

The information necessary for connecting to the centralized system 41 to perform a check on a label 10 or on a printable medium consists of a connection address, for example a URL address of the internet network. Such an address is advantageously printed on the label or the printable medium so as to be able to be read by optical means, for example incorporated in a matrix code of QR code type and also comprising the unique identifier of the label or of the printable medium.

The labels produced by the device implementing the method can, once produced, be applied to any type of object for which they will be able to add a form of authentication.

Thus, the label can be fixed onto a product or onto a packaging where it can be used as a seal to detect the opening thereof.

The label can also be affixed to documents to prove the authenticity thereof or to travel passes to avoid the latter being diverted from their legitimate holders.

Advantageously, the label will be produced with a structure which ensures its destruction if any attempt is made to detach the label from the object to which it is fixed so as not to be able to be reused on another object.

The printable media, once produced by the implementation of the method, are for example used for the creation of secured documents such as authentic deeds or travel passes.

In these cases, in the activation step, the printed content can be recorded in a database of the characteristics of the printable medium.

The invention claimed is:

1. A method for producing a label, on its own or incorporated on a printable medium, comprising at least one identifier and at least one authenticator, the method comprising the steps of:
generating a unique identifier;
printing the unique identifier on the label or the printable medium, the label or the printable medium incorporating an authenticator on all or part of the label or of the printable medium by a printing device;
wherein the unique identifier is generated at least partially by a centralized system remote from the printing device; and
wherein the unique identifier is generated without relation to a product for which the label or the printable medium is or will be intended for.

2. The method as claimed in claim 1, wherein the unique identifier is generated by the centralized system; and further comprising the steps of verifying that the printing device is registered with the centralized system to receive a unique identifier, and transmitting the unique identifier to the printing device by the centralized system.

3. The method as claimed in claim 2, further comprising the steps of printing and generating unique identifiers by a plurality of independent printing devices, each of said plurality of independent printing devices communicates with the centralized system to obtain unique identifiers or to generate a unique identifier.

4. The method as claimed in claim 1, wherein the unique identifier is generated by the printing device registered with the centralized system, the printing device is authorized to generate and to print series of unique identifiers, and assigned a unique origin code which is incorporated in the unique identifiers generated by the printing device.

5. The method as claimed in claim 4, further comprising generating the unique identifier by the printing device in accordance with a unique origin code assigned to the printing device and an identifier uniquely associated with and generated by the printing device, such that the unique identifier is unique to the centralized system.

6. The method as claimed in claim 1, further comprising steps of acquiring at least one image of the authenticator of the label or the printable medium, on which the unique identifier is printed, by a recording device; transmitting said at least one image of the authenticator by the recording device to the centralized system; and storing of said at least one image of the authenticator coupled with the unique identifier, printed on the label or the printable medium by the printing device, in a database of the centralized system.

7. The method as claimed in claim 6, further comprising the steps of acquiring the unique identifier printed on the label or on the printable medium by the recording device; and transmitting the acquired identifier associated with said at least one image of the authenticator to the centralized system, the centralized system rejects recording of the label in response to determination that the acquired identifier is not a unique identifier generated by the centralized system or by a printing device registered with the centralized system, the acquired identifier does not incorporate an origin code assigned to the printing device, or the acquired identifier has been assigned to a previously recorded label or a previously recorded printable medium.

8. The method as claimed in claim 7, further comprising the step of verifying that the recording device is registered with the centralized system to transmit an image of an authenticator of the label or of the printable medium.

9. The method as claimed in claim 6, further comprising the step of activating the label or the printable medium by transmitting a request to activate the label or the printable medium to the centralized system by an activation device, the recording device rejects the activation of the label or of the printable medium in response to the determination that the label or the printable medium has not been recorded by the centralized system or has been previously activated.

10. The method as claimed in claim 9, further comprising the step of verifying that the activation device is registered with the centralized system to request the activation of a label or of a printable medium or is authorized to request the activation of the label or of the printable medium by a prior identity check of a rights holder authorized previously to request the activation of the label or of the printable medium.

11. The method as claimed in claim 9, further comprising the step of associating an authenticator-identifier pair of the label or the printable medium recorded in the database to at least one of the following: specific information related to a product, a category of products, or an informational content of a document.

12. The method as claimed in claim 9, further comprising the step of performing the steps of transmitting said at least one image of the authenticator and transmitting the request to activate the label or the printable medium during a same communication with the centralized system.

13. The method as claimed in claim 9, further comprising the step of performing the steps of interrogating the centralized system to obtain a unique identifier, transmitting said at least one image of the authenticator and transmitting the request to activate the label during a same communication with the centralized system.

14. The method as claimed in claim 9, further comprising connecting a plurality of independent activation devices to the centralized system to request activations of the labels or the printable media.

15. The method as claimed in claim 6, further comprising the step of transmitting images of authenticators by a plurality of independent recording devices connected to the centralized system.

16. The method as claimed in claim 6, further comprising the step of processing the images of authenticators, by at least one of the following: the recording device and the centralized system, to translate the images into digital data allowing for an automatic comparison, by electronic means, of said images with images acquired and processed subsequently in the context of a check on the labels.

17. The method as claimed in claim 1, wherein the label or the printable medium is a substrate comprising at least colored fibers or added particles, contrasting with a color of the substrate, scattered chaotically in the substrate; and wherein the authenticator corresponds to an arrangement resulting from a scattering of said at least colored fibers or added particles, in at least one area of a sheet produced with the substrate.

18. The method as claimed in claim 17, wherein the substrate belongs to one of the following categories: papers, synthetic materials, adhesives, inks, varnishes, cardboards, or plastics.

19. The method as claimed in claim 1, wherein the authenticator is a bubble code comprising a transparent polymer with captured bubbles whose shapes, dimensions and positions are result of a process of chaotic formation of the captured bubbles in the transparent polymer.

20. A device for manufacturing labels or authenticatable documents, comprising:
a centralized system comprising a database;
at least one printing device comprising at least one of:
a generator to generate a unique identifier incorporating a unique origin code of said at least one printing device; or
a communication device to communicate with the centralized system configured to transmit a request for assignment of the unique identifier, and to receive from the centralized system the unique identifier;
at least one recording device comprising an acquisition device to acquire at least one image of at least one authenticator borne by a label or a document, and a communication device to transmit said at least one image to the centralized system;
the centralized system being configured to store the unique identifier and said at least one image associated with the unique identifier of the label bearing said at least one authenticator in the database; and
at least one activation device comprising a communication device to transmit a request to activate a label or a document bearing the unique identifier and said at least one authenticator.

21. The device for manufacturing labels or authenticatable documents as claimed in claim 20, wherein each of the communication device of a plurality of printing devices, of a plurality of recording devices and of a plurality of activation devices are configured to establish communications with a same centralized system.

22. The device for manufacturing labels or authenticatable documents as claimed in claim 20, wherein said at least one printing device, said at least one recording device and said at least one activation device are grouped together in a standalone production unit to provide printing, recording and activation functions in communication with the centralized system.

23. The device for manufacturing labels or authenticatable documents as claimed in claim 20, wherein said at least one printing device is configured to print the labels or the documents on a paper medium.

24. The device for manufacturing labels or authenticatable documents as claimed in claim 20, wherein said at least one printing device is configured to print labels or documents on a medium of synthetic material.

\* \* \* \* \*